(12) United States Patent
Greenberg

(10) Patent No.: US 8,515,460 B2
(45) Date of Patent: Aug. 20, 2013

(54) TAGGING DATA UTILIZING NEARBY DEVICE INFORMATION

(75) Inventor: Itai Greenberg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/674,035

(22) Filed: Feb. 12, 2007

(65) Prior Publication Data

US 2008/0194270 A1 Aug. 14, 2008

(51) Int. Cl.
*H04W 24/00* (2009.01)

(52) U.S. Cl.
USPC ............... 455/456.6; 455/456.1; 455/418

(58) Field of Classification Search
USPC ............ 455/456.1; 348/207.99–376
See application file for complete search history.

(56) References Cited

U.S. PATENT DOCUMENTS

| | | | |
|---|---|---|---|
| 5,946,444 A | 8/1999 | Evans et al. | |
| 6,819,783 B2 | 11/2004 | Goldberg et al. | |
| 6,914,625 B1 | 7/2005 | Anderson et al. | |
| 7,068,309 B2 | 6/2006 | Toyama et al. | |
| 7,751,597 B2* | 7/2010 | Gabara | 382/116 |
| 7,813,557 B1* | 10/2010 | Bourdev | 382/205 |
| 2004/0135902 A1* | 7/2004 | Steensma | 348/231.99 |
| 2004/0169731 A1 | 9/2004 | Shiiyama | |
| 2005/0114357 A1 | 5/2005 | Chengalvarayan et al. | |
| 2005/0186965 A1 | 8/2005 | Pagonis et al. | |
| 2006/0007315 A1* | 1/2006 | Singh | 348/207.99 |
| 2006/0095540 A1 | 5/2006 | Anderson et al. | |
| 2007/0282907 A1 | 12/2007 | Chambers | |
| 2011/0099478 A1 | 4/2011 | Gallagher et al. | |

FOREIGN PATENT DOCUMENTS

WO 2006028383 3/2006

OTHER PUBLICATIONS

Shane Ahern, et al. ZoneTag: Designing Context-Aware Mobile Media Capture to Increase Participation. http://groups.sims.berkeley.edu/pics/papers/Ahern_et_al_zonetag_pics06.pdf. Last accessed Dec. 13, 2006.
Kentaro Toyama, et al. Geographic location tags on digital images. MM'03, Nov. 2-8, 2003. ACM. http://delivery.acm.org/10.1145/960000/957046/p156-toyama.pdf?Key1=957046&key2=9547806611&coll=GUIDE&dl=ACM&CFID=11111111&CFTOKEN=2222222. Last accessed Dec. 13, 2006.
"My Image Garden", *Proceedings of Computer Science & Information Technology (CS & IT)*, Retrieved from <http://www.usa.canon.com/app/html/Scrapbooking/mig_organize.html?v=p>,(2012), 2 pages.
Girgensohn, et al., "Simplifying the Management of Large Photo Collections", *International Conference on Human-Computer Interaction*, Available at <http://citeseerx.ist.psu.edu/viewdoc/download?doi=10.1.91.2077&rep=rep1&type=pdf>, (Sep. 1, 2003), 8 pages.
Kim, Jinho et al., "Photo Cube: An Automatic Management and Search for Photos Using Mobile Smartphones", *In Proceeding of the Ninth IEEE International Conference on Dependable, Automatic and Secure Computing*, (Dec. 12, 2011), 7 pages.

* cited by examiner

*Primary Examiner* — Erika A Washington
(74) *Attorney, Agent, or Firm* — Wolfe-SBMC

(57) ABSTRACT

Data is automatically tagged utilizing information associated with nearby individuals, among other things. Location-based technology is leveraged to enable identification of individuals and associated devices within a distance of a data capture device. User information is acquired from proximate devices directly or indirectly before, during or after data recording. This information can be utilized to tag captured environmental data (e.g., images, audio, video . . . ), amongst other types, to facilitate subsequent location, filtration and/or organization.

12 Claims, 10 Drawing Sheets

TAGGING DATA UTILIZING NEARBY DEVICE INFORMATION

BACKGROUND

The pervasiveness of computers and other processor-based devices has resulted in data proliferation such that vast amounts of digital data are created and stored daily. Although originally the sole domain of well-funded companies and research institutions, technology advancements and cost reductions over time have enabled computers and other electronic devices to become commonplace in the lives of most everyone.

Initially, digital computers were simply very large calculators designed to aid performance of scientific calculations. Only many years later had computers evolved to a point where they were able to execute stored programs and provide more diverse functionality. Constant improvement of processing power coupled with significant advances in computer memory and/or storage devices (as well as expediential reduction in cost) led to persistence and processing of a large volume of data.

Continued advancements over the years have led to a dramatic decrease in both size and cost of electronic components. As a result, the popularity of bulky desktop-style computers is giving way to smaller mobile devices. Individuals interact with a plurality of such devices daily including mobile phones, personal digital assistants, media players, digital recorders and/or hybrids thereof. For example, individuals employ digital cameras (e.g., solo-device, camera phone, web camera . . . ) to take a number of pictures, videos or the like.

The Internet has further driven creation of digital content. The Internet provides an infrastructure that supports applications such as e-mail, file transfer and the World Wide Web (Web), among other things. This encourages users to create or capture digital content such that it can be transmitted or accessed expeditiously over the Internet. As a result, digital devices are employed to capture media and store such files locally and/or remotely. For example, individuals may upload their pictures, movies, music or the like to one or more websites or servers to enable people to download or otherwise access such content. Alternatively, individuals may send files via e-mail, FTP (File Transfer Protocol) or multimedia messaging service (MMS), among other things. Unfortunately, local or remote stored data is of minimal use unless it can be located expeditiously.

To maximize the likelihood of locating relevant information amongst an abundance of data, search engines or query processors are regularly employed. A search engine is a tool that facilitates data navigation based on entry of a query comprising one or more keywords. Upon receipt of a query, the engine or processor is operable to retrieve a list of objects (e.g., pictures, images, sounds, music, multimedia . . . ), typically ranked based on relevance to the query.

Search engines identify relevant content utilizing information or data associated with the content. This information is often referred to as metadata, which is defined as data that describes other data. For example, a conventional digital camera can tag a picture with the date and time it was taken. Hence, pictures can be located by a search engine based on date and/or time of creation. However, this is somewhat limited.

Similarly, metadata plays a role with respect to organizing, sorting or otherwise interacting with content. For example, it may be advantageous to sort files into one or more folders or other container to aid location. Further, programs can be employed to automatically sort data as function of file name and/or metadata (e.g., file type) associated therewith. However, where the metadata associated with a file consists solely of file type, time and/or date, there are limited ways to divide or otherwise differentiate content.

To enable more useful or intuitive searches and/or facilitate organization, sorting or the like, users can manually associate metadata with a file. For example, a picture can be decorated with metadata describing elements of the picture such as people in the picture, location, event, among other things. Unfortunately, this can be a very time consuming task that may deter employment of such functionality.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the disclosure pertains to automatic tagging of data to facilitate subsequent, expeditious location and/or organization thereof. More particularly, captured environmental data (e.g., pictures, audio, video . . . ), amongst other types, can be tagged utilizing information afforded by individuals nearby when the data was recorded or otherwise provided. Before, during or after recording, requests can be sent for information regarding individuals and/or associated devices within a distance of a recording device. Information such as the name of the device user/owner, among other things can be provided to the recording device and employed to tag or label captured data. These tags or metadata provide a mechanism for differentiating and/or locating data of interest.

In accordance with an aspect of the disclosure, a system is provided for automatically tagging data including an acquisition component and a tag component. The acquisition component obtains or acquires information concerning nearby individuals, among other things. In one embodiment, this information can be acquired directly from other devices utilizing a peer-to-peer protocol. Additionally or alternatively, the same information can be acquired from a central service via a client-service protocol. The tag component can utilize the provided information to generate tags for data to improve the searching, filtering and/or sorting experience for users.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are afforded for automatic tagging of data to facilitate expeditious location and retrieval, among other things. More specifically, the data can be tagged with information associated with individuals who are nearby or within a particular distance when the data was captured, for instance. This information can further be employed to determine or infer other metadata tags to affix to the data. Further yet, mechanisms are also provided to filter or otherwise control how the data is tagged and what information is revealed by proximate devices.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
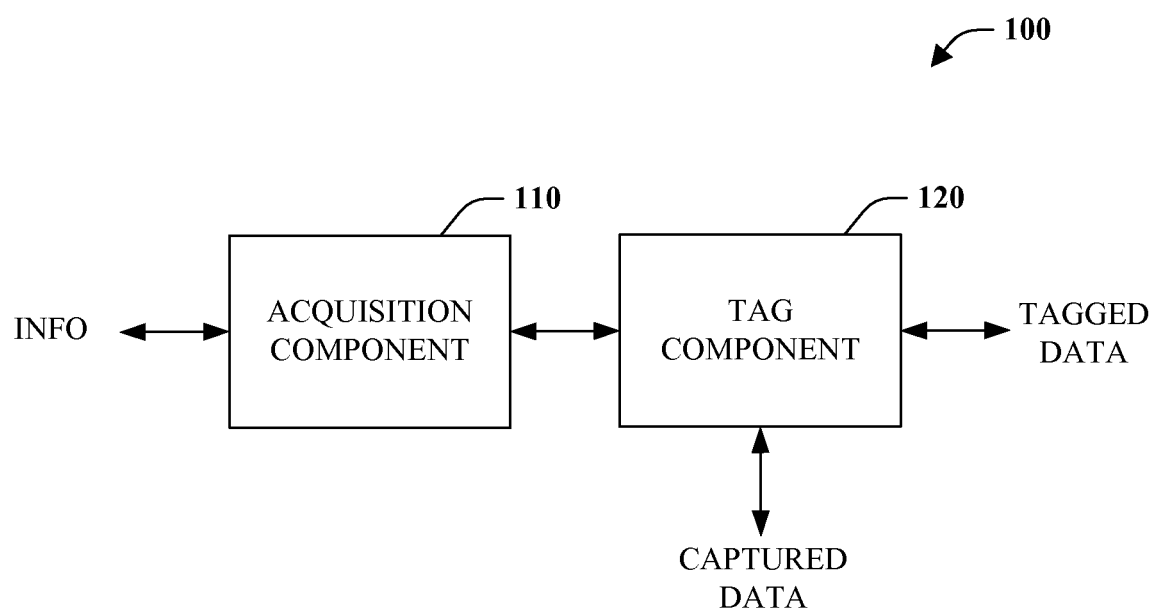
FIG. 1 is a block diagram of a representative data tagging system in accordance with an aspect of the claimed subject matter.

Referring initially to FIG. 1, a data tagging system 100 is illustrated in accordance with an aspect of the claimed subject matter. The system 100 includes acquisition component 110 and tag component 120 operable to facilitate automatic tagging of data utilizing information associated with nearby individuals.

The acquisition component 110 receives, retrieves or otherwise obtains or acquires information from at least one individual and/or device associated with the individual. More particularly, such information is acquired from nearby individuals or others within a particular distance or proximity of a device. This information can include device user name, distance, contact information and/or personal information management (PIM) data, among other things. The acquisition component 110 is communicatively coupled to the tag component 120 to enable interaction.

The tag component 120 employs information received or retrieved from the acquisition component 110 to tag or label data. Captured data or environmental data can refer to recordings such as those associated with images, audio and/or video, among other things. Accordingly, the tag component 120 can receive or retrieve picture, sound and/or video media files or a pointer thereto from a captured component or device (not shown). The tag component 120 can then request information from the acquisition component 110 associated with nearby individuals. This information can then be employed to create tagged data automatically or semi-automatically, wherein the information functions as content metadata.

By way of example, consider a situation where a user is at a party and takes a picture of a few friends. System 100 can be utilized by the imaging device and/or associated system to automatically tag the picture with information about proximate individuals at the time the picture was taken. For example, the picture can be tagged with metadata identifying the people in the picture. Later, if the user desires to locate the picture, the user can utilize people's names as search criteria. While such tagging could be done manually by users, in practice users will not take advantage of such a capability because it is quite time consuming. Furthermore, not only can system 100 tag the picture with information about individuals in the picture, but also those that are outside an image. Including this additional information allows users to improve how they search. For instance, a user may search for a picture by the term "David" because the user knows that David was at the party even though he is not in the desired picture.

Figure 2:
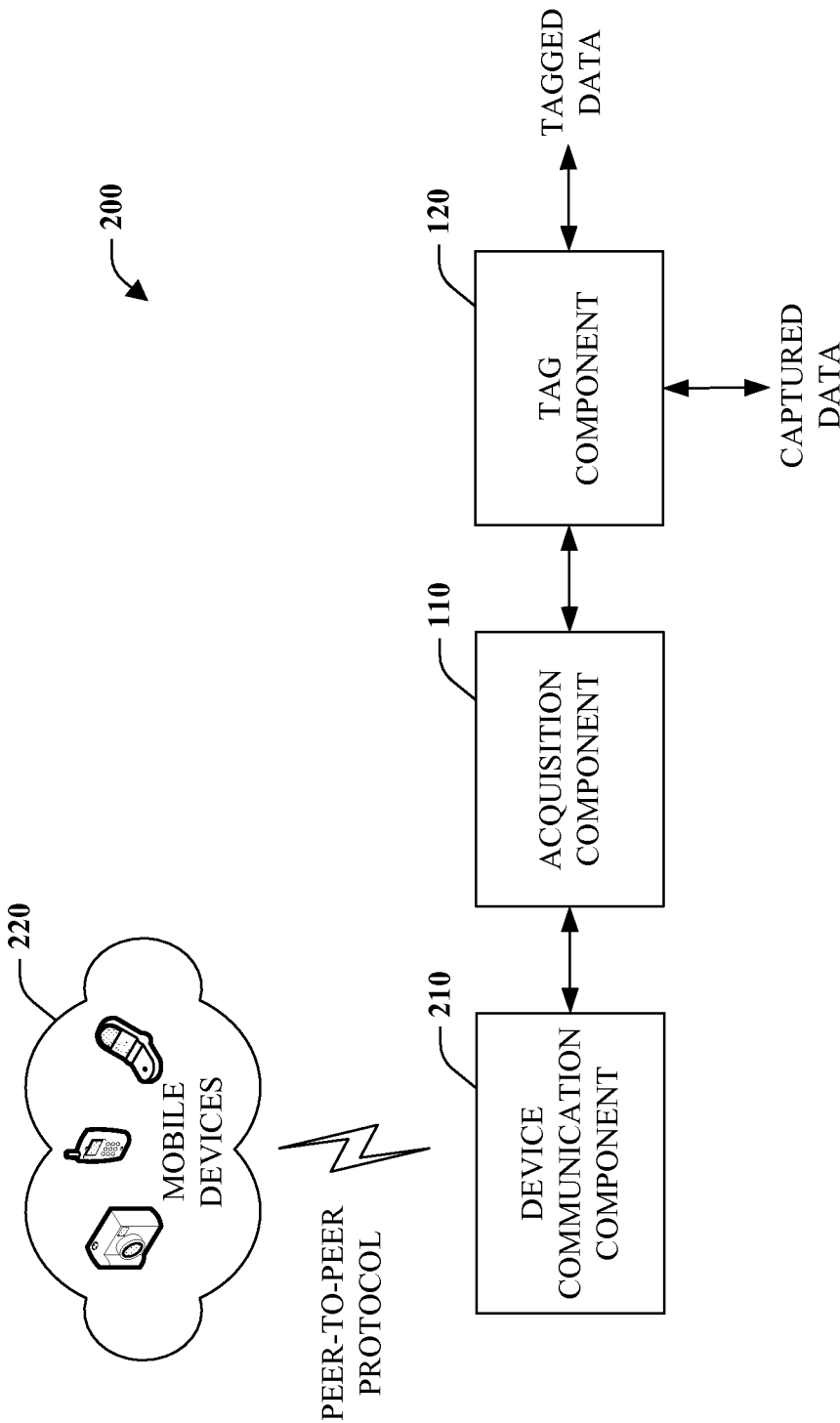
FIG. 2 is a block diagram of an embodiment of the data tagging system supporting peer-to-peer interaction.

Turning to FIG. 2, a data tagging system 200 is illustrated in accordance with one embodiment. Similar to system 100 of FIG. 1, system 200 includes the acquisition component 110 and the tag component 120, as previously described. System 200 also provides a device communication component 210 communicatively coupled to the acquisition component 210 to facilitate communication amongst devices. The device communication component 210 is a mechanism that can request and receive information directly from other devices such as mobile devices 220. To communicate with each other, devices can employ any one of a number of peer-to-peer communication technologies including without limitation Wi-Fi and Bluetooth®. A particular handshake type protocol can be utilized to request and receive information from other devices in a secure manner. This protocol can allow devices to mutually authenticate themselves. Furthermore, devices can communicate with each other transparently and share information such as device user/owner name, location and/or contact information, inter alia.

For instance, a few people can be carrying handheld camera phones or digital camera devices that are equipped with location awareness technology such as GPS (Global Positioning System), AGPS (Assisted GPS) or TDOA (Time Difference of Arrival). When one of them takes a picture, the picture-taking device can transparently communicate with the other devices to obtain information. Nearness can be controlled by distance limitations associated with the peer-to-peer communication technology. Additionally or alternatively, locations of the devices can be provided as at least part of the communicated information. The picture-taking device can subsequently filter out information provided by devices outside of set distance or range (e.g., 10 feet, 20 feet . . . ). This filtered information can then be utilized as metadata to tag the picture to facilitate subsequent location, organization, filtering, sorting or the like.

It is to be noted that devices need not be required to include location awareness technology such as GPS. Other mechanisms can also be employed and are to be deemed within the scope of the appended claims. By way of example and not limitation, peers can rely on wireless signal strength to determine that others are relatively close. For instance, if two devices can communicate over Bluetooth®, it can mean that they are relatively close to each other or nearby.

Figure 3:
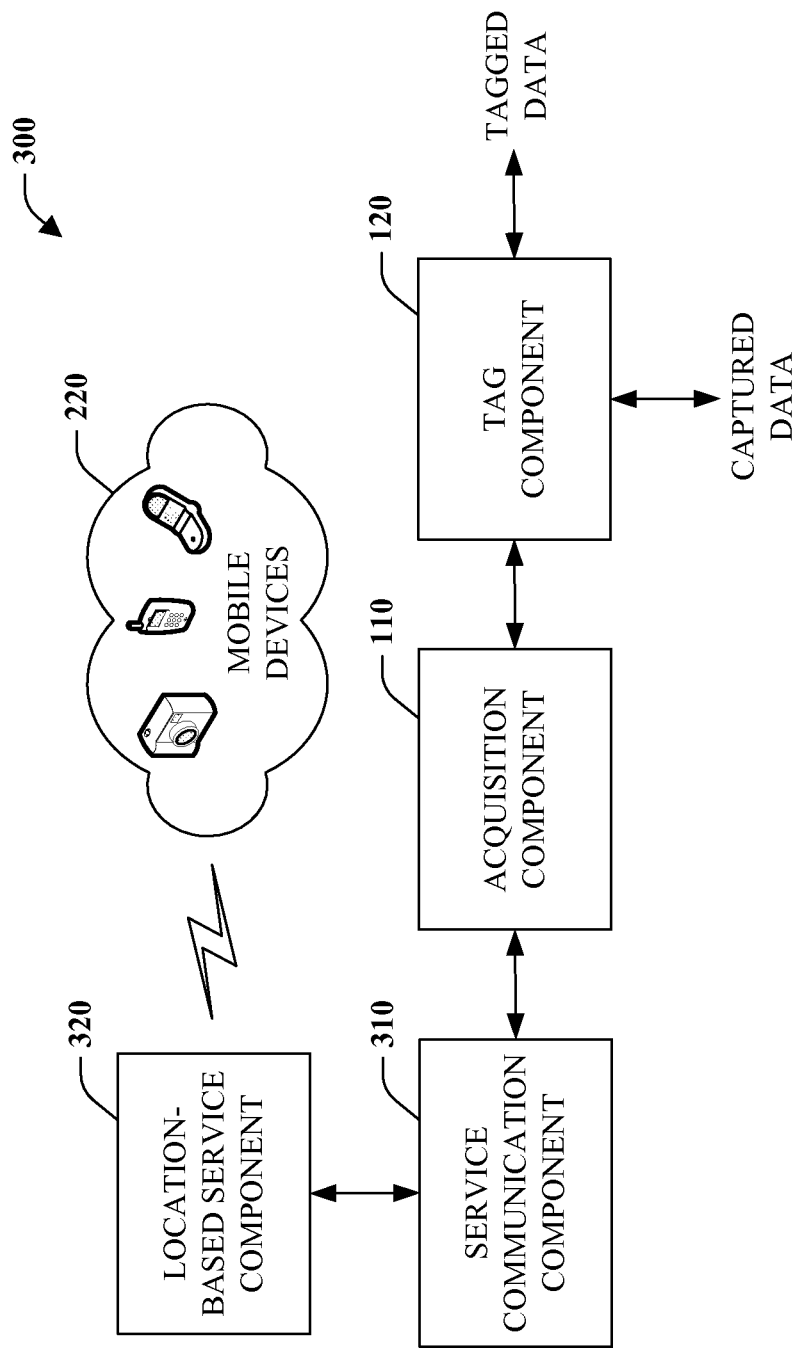
FIG. 3 is a block diagram of another embodiment of the data tagging system that employs a central service.

FIG. 3 illustrates a data tagging system 300 in accordance with another embodiment. Similar to systems 100 and 200 of FIGS. 1 and 2, respectively, system 300 includes the data acquisition component 110 and tag component 120, as described previously. In brief, the tag component 120 is operable to tag captured data with information concerning nearby individuals afforded by acquisition component 110. Here, the acquisition component 110 is communicatively coupled to the service communication component 310. Unlike the embodiment of system 200, system 300 need not acquire information directly from other devices. Rather, system 300 supports retrieval of information from a service, such as a web service for example via a client-service protocol. The service communication component 310 is operable to communicate with a remote location-based service component 320 for example via GPRS (General Packet Radio Service) amongst other technologies.

The location-based service component 320 can maintain information regarding individual device users and their locations. For instance, one or more mobile devices 220 can agree to allow their location to be accessible by the location-based service component 320. Further, users can provide the service component 320 information for distribution. Such information can be different for particular individuals or groups thereof. In one instance, rules can be associated with information to enable distribution to be controlled by an individual. Upon device request, information can be retrieved from other devices themselves and/or a store and provided back to the service communication component 310. In effect, the location-based service component 320 can act as a proxy between devices 220. Note also that even if a provider such as service component 320 is willing to share information, a requester may decide to accept or ignore it.

In one instance, subsequent to or concurrently with generation of a video, a video recording device can request information from nearby individuals via a web service. More particularly, the recording device can provide its identity and/or location to the service and information about individuals within a particular distance or zone can be provided in return to the recording device. At least a portion of this information can then be utilized to tag the video or portions thereof.

It is to be noted that FIGS. 2 and 3 illustrate but two possible embodiments of aspects of the claimed subject matter. It should be appreciated that others are possible and to be deemed within the scope of the appended claims. By way of example and not limitation, another embodiment can include a combination or hybrid of the aforementioned described embodiments. For instance, some devices can use the central service while others utilize peer-to-peer communication. Additionally or alternatively, devices within a particular zone can identify themselves via peer-to-peer communication, but information can be retrieved from a remote service.

Figure 4:
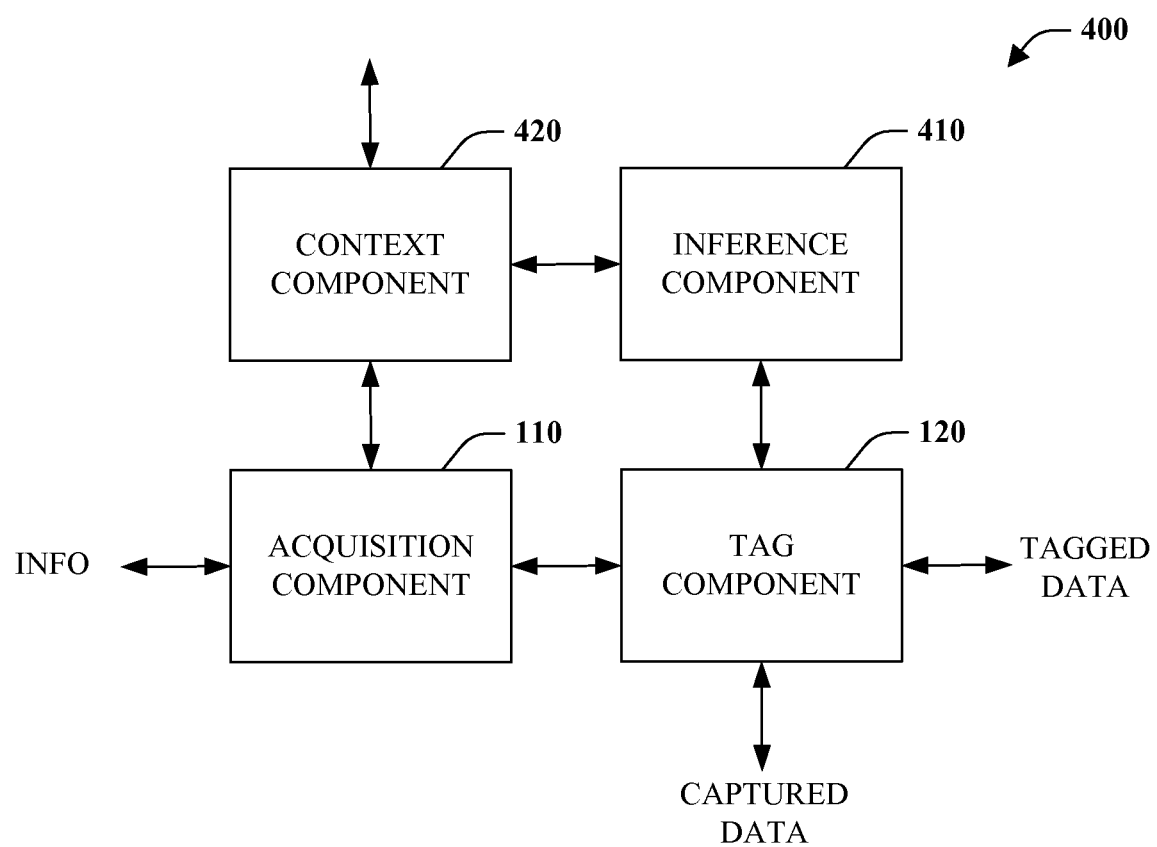
FIG. 4 is a block diagram of a representative system that facilitates tagging of captured data in accordance with an aspect of the claimed subject matter.

Referring to FIG. 4, a system 400 is illustrated that facilitates tagging of captured data. The system 500 provides the acquisition component and tag component 120, as described supra. In short, the acquisition component 110 acquires information pertaining to users within a particular distance and makes this information available to the tag component 120 for use in tagging captured data (e.g., audio, video, images . . . ). However, tagging need not be limited to provided information. More intelligent tagging can be employed via inference component 410 and/or context component 420.

The inference component 410 is communicatively coupled to the tag component 120 and operable to add and/or remove metadata tags as a function of inferences and/or determinations regarding relevant information (e.g., potential search terms, significant feature . . . ). In one instance, the inference component 410 can infer additional tags based on current tags or metadata alone or in combination with other information. For example, conventional date and/or time metadata can be utilized to infer other tags such as holidays (e.g., Christmas, New Years Eve, New Years Eve Day/Night . . . ). In another example, distance and/or location of a user can be employed to infer relative position to a recording device. This could then be utilized to determine, within a threshold, whether or not a particular user would be in a picture, for instance, and label individuals appropriately. Further yet, users may provide or enable access to a variety of different information that can be utilized to infer tags. For instance, if personal information management (PIM) data is accessible, it can be utilized generate a tag such as "Joe's Birthday Party" where one or more proximate users include such an annotation for the particular day and time.

The context component 420 is a mechanism that provides contextual information to the acquisition component 110 and/or the inference component 410. Such information can be received or retrieved from third party sources or mined from collections of user information, among other things. For instance, the context component 420 can provide information regarding significant events (e.g., Presidential Election, Super Bowl . . . ) or area landmarks (e.g., Statue of Liberty, Golden Gate Bridge, Las Vegas strip, Grand Central Station . . . ). The inference component 410 can cause such information to be utilized as tags for captured data in certain instance, such as the proximity to a landmark, for example. In another exemplary instance, the context component 420 can provide information about group members or affiliations such as bands, sports teams, political parties, social networks and the like. Where a particular number of members of a group are nearby the inference component 410 can inject the group name for tagging.

It should be appreciated that inference component 410 can provide functionality to enable inferences to be made about inferences. For example, an inferred tag can be utilized to infer another tag. Similarly, inferences can be made about the probability that a tag inferred or otherwise provided will be a keyword in a search criterion. In this manner, tags can be added or removed to increase the likelihood that a user will be able locate such data. The inference component 410 can also be employed to reason about the top-k tags where metadata is limited to a particular size or number of tags.

Figure 5:
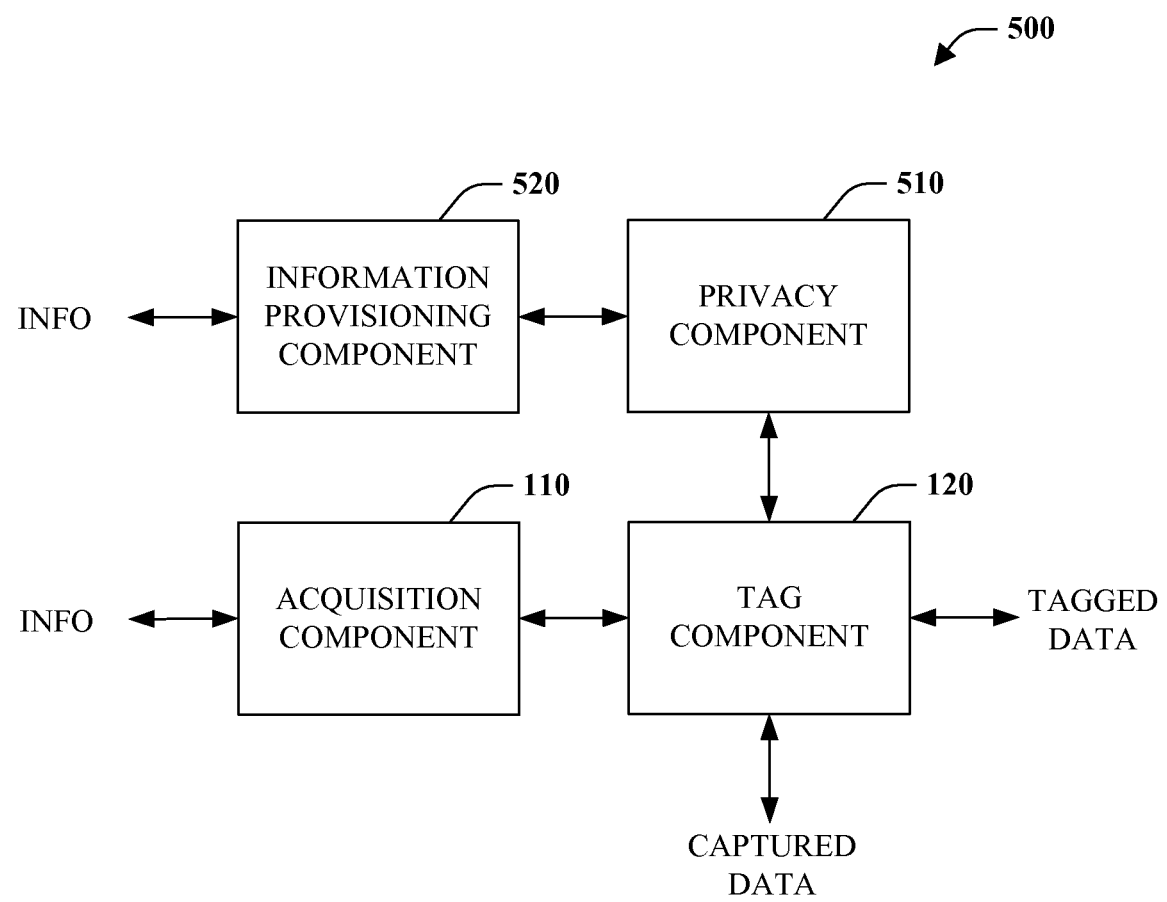
FIG. 5 is a block diagram of a representative system for tagging and provisioning data.

FIG. 5 depicts a system 500 for tagging and provisioning information in accordance with an aspect of the claimed subject matter. In addition to the previously described acquisition component 110 and tag component 120, the system 500 includes a privacy component 510. The privacy component 510 can interact with the tag component 120 to filter tags to ensure that only particular individuals' information is utilized as tags. For instance, criteria can be specified to allow or block different individual information as a function of a list such as IM (Instant Message) buddy list, email address book or the like. In this manner, tagging can be controlled in a manner comparable to the way people control access to their social networking web pages, among other things.

Still further yet, the privacy component 510 can interact similarly with provisioning component 520 to control information provided to other devices. When information is requested from the device because it is nearby for example, information is supplied via the information provisioning component 520. Users can set-up rules, preferences or other types of criteria to manage information provisioning. For example, some or all devices may be blocked from receiving any information at all, while others may on receive particular types of information or the like.

Figure 6A:
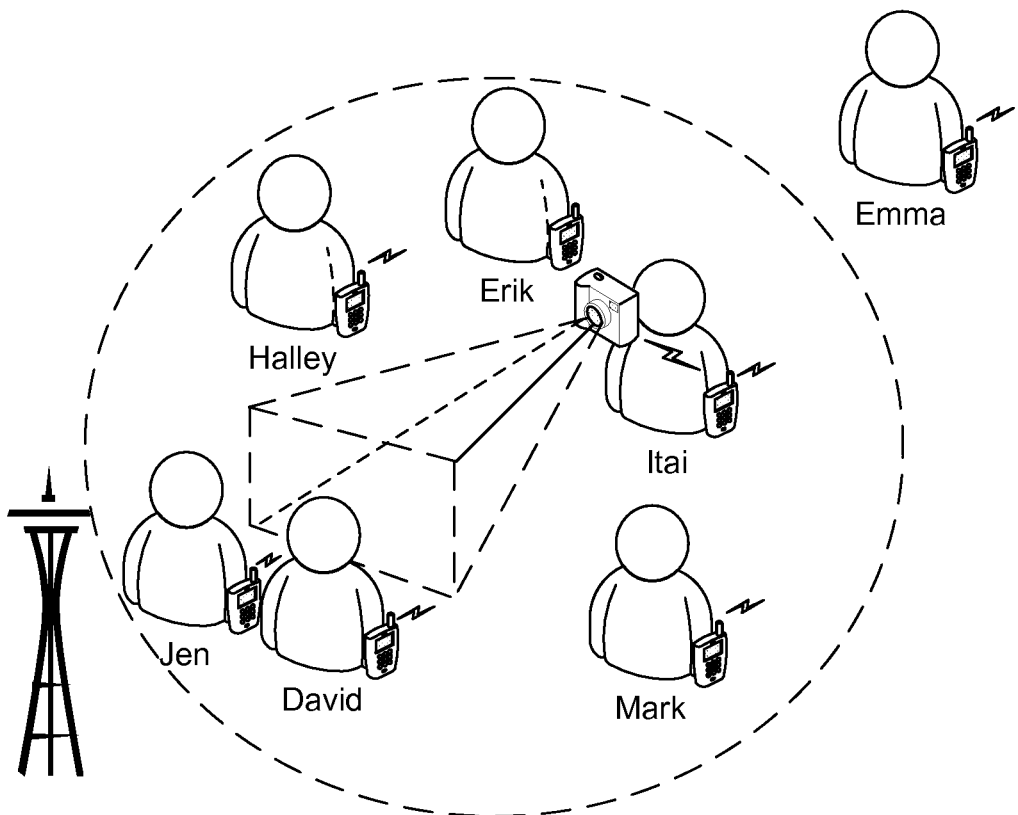
FIGS. 6a-b illustrate an exemplary use scenario to provide clarity and understanding with respect to at least a few disclosed aspects of the claimed subject matter.
Figure 6B:
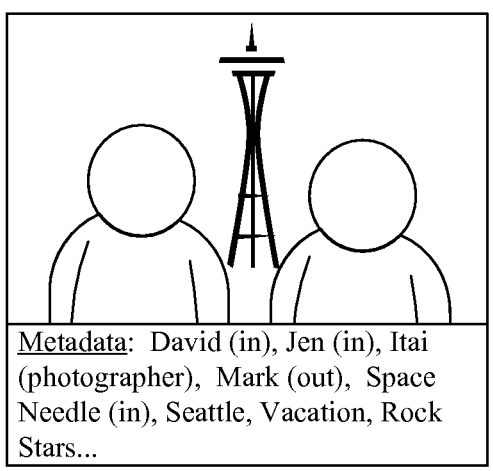

FIGS. 6a-b provide an illustrative example of aspects of the claimed subject matter. The example is not meant to limit the appended claims but rather to afford further clarity and understanding with respect to aspects of this detailed description.

FIG. 6a illustrates an exemplary scenario involving seven individuals, Itai, David, Jen, Mark, Erik, Halley and Emma each equipped with at least one mobile device. Itai takes a picture of David and Jen against the backdrop of the Space Needle in Seattle with his digital camera. This image represented in FIG. 6b can be automatically tagged with metadata associated with nearby individuals, among other things.

The dashed circle illustrates a set proximity with respect to Itai specifically identified and/or mandated by communication constraints. Those inside the circle, namely Itai, David, Jen, Mark, Halley and Erik can be deemed nearby. Individuals residing outside the circle are not. Here, Emma is distant from Itai. The picture can be tagged with the names of users or owners of nearby mobile devices.

However, individual preferences can influence how the picture is tagged. For instance, individuals can choose not to participate in data tagging. Here, Erik has chosen to keep his identity/information private. In addition, the individual associated with the data capture device, Itai, can limit tagging to particular individuals, for instance those on an IM buddy list, and/or preclude other individuals. In this instance, Itai has blocked Halley. Accordingly, the picture can be tagged with "David," "Jen," "Itai," and "Mark."

Additional metadata can also be associated with the picture as a function of context and/or inferences. For instance, it can be determined that Mark and David are in a band called "Rock Stars." This information can then be utilized as metadata. Similarly, the location of Itai can indicate that he is in the city of Seattle and close to the landmark Space Needle. Additionally or alternatively, personal information can be acquired indicating that at the time of the photograph Jen and David are on vacation, for example from individuals' calendars. The metadata can reflect this fact. Still further yet, based on each individual's location relative to the imaging device, it can be determined or inferred whether or not an individual is in the photograph, outside the photograph or the photographer, among other things. This can be employed to further tag the photograph.

It should be appreciated that a user can be associated with more than one mobile device. These devices can interact or cooperate to enable tagging functionality, inter alia. As shown here, Itai can have a digital camera and a smart phone. The digital camera can communicate with the smart phone to retrieve information about nearby individuals and/or other information that can be utilized by the camera to tag photographs as taken.

Other conventional technologies can also be employed in connection with the subject matter to further assist in tagging captured data to facilitated subsequent location, organization of the like. For example, voice or facial recognition technologies can be incorporated. Alone such technologies are not particularly useful for automated tagging due at least to accuracy problems. Voices and/or images are compared to store signatures to determine matches. Unfortunately, if individuals are not in the same position as captured by the signature or change in any number of ways, these recognition technologies will not be able to identify individuals. For example, a user with a cold would cause problems for voice recognition systems. Similarly, regular aging, different clothing (e.g., hat, hood . . . ) and/or facial hair can defeat facial recognition systems. However, even with their deficiencies, these systems can be utilized as a part of a larger system, such as those described above, to aid inferences about useful metadata. For example, facial recognition technology in combination with received distance information can increase the likelihood of identifying individuals captured by a photograph. Of course, facial recognition technology would be of little use when a person is nearby yet not captured in the photograph.

The components of the systems described supra can be implemented in a myriad of ways all of which are included within the scope of the claimed innovation. By way of example and not limitation, the components can be embodied as an application-programming interface (API), dynamically linked library (dll) or the like. This API, or like mechanism, can be employable by a mobile device via hard coding or software download, among other things. The API can then be utilized to leverage device resources including location awareness and communication capabilities to tag captured environmental data and/or provision information to a service or other device to facilitate such tagging.

While aspects of this disclosure have been described with respect to captured environmental data, it is to be appreciated that the subject innovation is not limited thereto. Other embodiments that utilize information from nearby individuals or associated devices to tag data are possible and to be deemed within the scope of the subject claims.

By way of example and not limitation, aspects of the disclosure can be applied with respect to transferring data to and amongst mobile devices. For instance, consider communications amongst digital music players (e.g., MP3 players . . . ). User A may desire a song that User B has persisted on her music player. User B can transfer a copy of the song to User A's player utilizing a peer-to-peer communication protocol. Upon receipt of the song, User A's device can transparently request and receive information from nearby individuals that can be employed to label the song. Later if User A seeks desires to play the song and recalls only that it was provided while she was talking to User C and User D, she can utilize this information as search criteria to locate the song.

Aspects can also be utilized in more implicit scenarios where a trigger to initiate transmission of information is not an explicit user action but rather an event. Consider a scenario in which User A and User B meet for lunch. In such an event, user calendar information can be updated transparently including the time and location of the meeting, for example.

The aforementioned systems, architectures and the like have been described with respect to interaction between several components. It should be appreciated that such systems and components can include those components or sub-components specified therein, some of the specified components or sub-components, and/or additional components. For example, a system can support both device and service communication mechanisms described with respect to systems 200 and 300. Sub-components could also be implemented as components communicatively coupled to other components rather than included within parent components. Further yet, one or more components and/or sub-components may be combined into a single component to provide aggregate functionality. For instance, one or more of the device communication component 210 and the service communication component 310 can be embodied as sub-components of the acquisition component 110 rather than being communicatively coupled thereto. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the tag component 120 and/or the inference component 410 can employ such mechanisms to infer and or reason about how to tag data. Similarly, the privacy component can use like mechanisms to determine how and to whom information should be provisioned to maintain user privacy and/or security.

Figure 7:
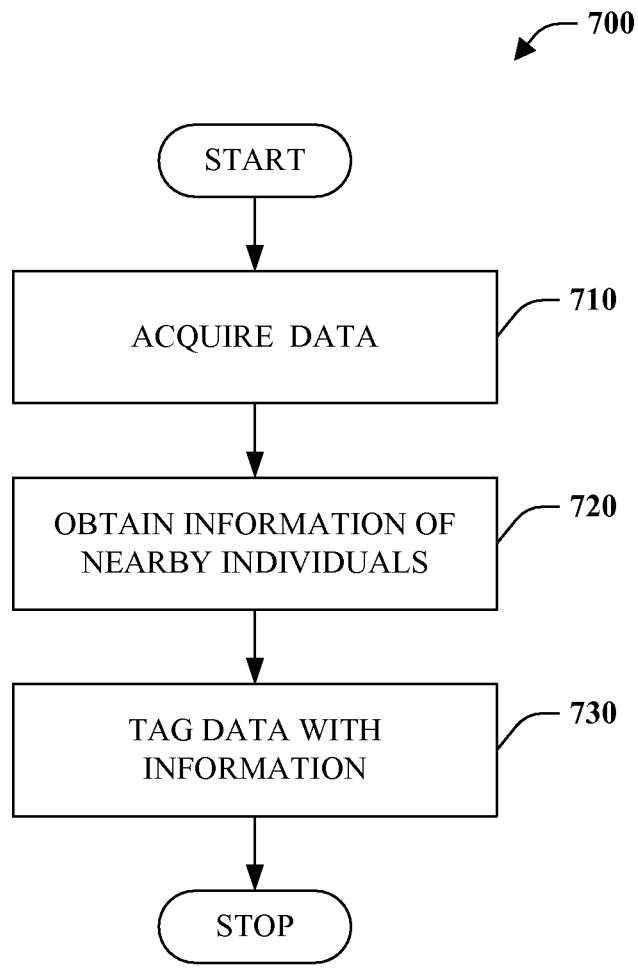
FIG. 7 is a flow chart diagram of a method of tagging data.
Figure 8:
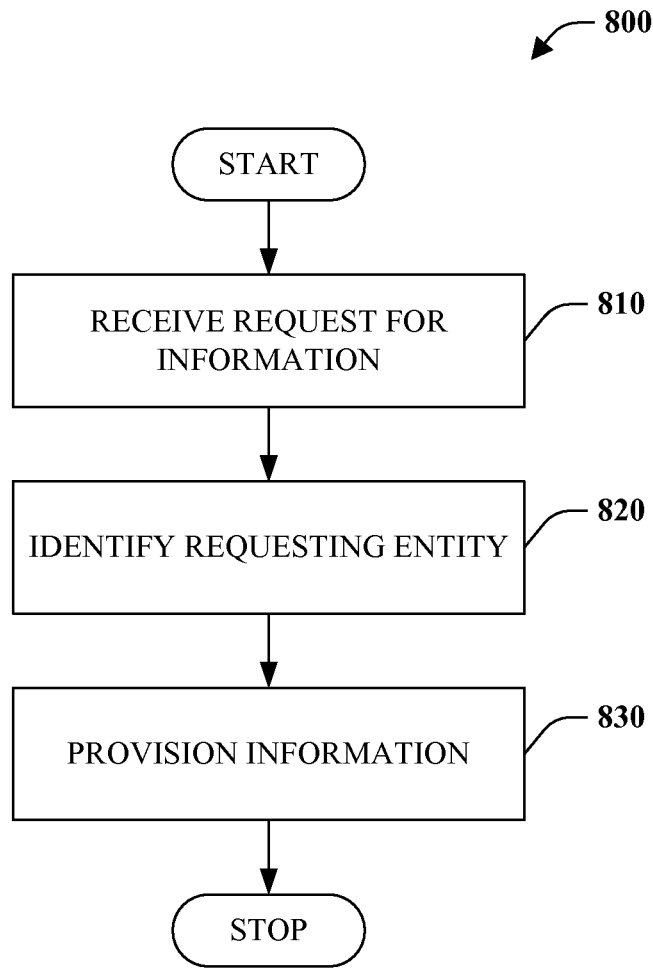
FIG. 8 is a flow chart diagram of a method of provisioning information.

In view of the exemplary systems described supra, methodologies that may be implemented in accordance with the disclosed subject matter will be better appreciated with reference to the flow charts of FIGS. 7 and 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 7, a method of tagging data 700 is depicted in accordance with an aspect of the claimed subject matter. Data can be tagged automatically by method 700 to facilitate subsequent location and/or retrieval, among other things. At reference numeral 710, data is acquired. For example, data can be captured by a data capture or media recorder device. This data can be environmental data such as that associated with sounds and/or images captured by a camera or other recording device. Alternatively, it is to be appreciated that data can be acquired by simple transmission or the like.

At numeral 720, information is obtained concerning individuals nearby the recording device. Such information can include device user or owner name amongst other information. The distance that qualifies individuals as nearby can be preset. For instance, a user of a data capture device can identify a particular distance from the device from which he/she would like to acquire information. Additionally or alternatively, the distance can be constrained by the device and/or associated communication mechanism. For example, if communication is performed utilized Bluetooth® wireless technology, the range can be from three feet to three hundred feet depending on device capabilities.

At reference numeral 730, the captured data is tagged utilizing information provided by nearby individuals and/or devices associated with such individuals. It is to be appreciated that other context information and/or technologies can be employed to facilitate identifying useful metadata. For example, actual distance from the recording device, date and time, landmarks and/or current news can be utilized to tag captured data in a manner that enable a user to easy locate and/or organize the data. Further yet, obtained information can be filtered prior to the act of tagging the data for instance to reject data out of range and/or associated with excluded or undesignated individuals.

By way of example and not limitation, consider recording of meetings amongst a number of individuals. One individual may place a digital recorder on a table surrounded by meeting participants to record the meeting for later reference. Before, during and/or after recording of the meeting, the identities of the participants can be acquired from associated devices (e.g., laptop, mobile phone, PDA . . . ). Additional information may also be acquired from several participants' calendars identifying the meeting as a "Sales Meeting." Accordingly, the recording can be tagged with the date, time, title of the meeting and the participants. Any or all of this metadata can be utilized as search criteria to later enable an individual to locate the recording. For example, if an individual later desires to retrieve the recording and only recalls that it was a sales meeting and that Doug Jones and he attended, a search engine can be provided these keywords or search terms to help located the recording. Further yet, such metadata can be employed by software to automatically organize, classify or link the file amongst others. For instance, based on the metadata it can appear in a container associated with sales meetings and/or Doug Jones.

Referring to FIG. 8, a flow chart diagram of a method of provisioning information 800 is illustrated in accordance with an aspect of the claimed subject matter. At reference numeral 820, a request is received for information. In particular, this request can be for information to tag environmental data captured nearby, for instance. The requesting entity can be identified at numeral 830. For example, the request itself can communicate the identity of the requesting user and/or associated device. At reference numeral 830, information can be provisioned to the requesting user/device. The type of information provided, if provided at all, can be dependent upon the identity of the requesting entity. In one instance, rules or preferences can be setup by a device user/owner regarding to whom access would be given and/or to which information individuals may access or be supplied. For example, access can be limited to those individuals identified in an email address book and/or on an instant message buddy list. Further yet, calendar information may be provided only to individuals labeled as co-workers, family or friends.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
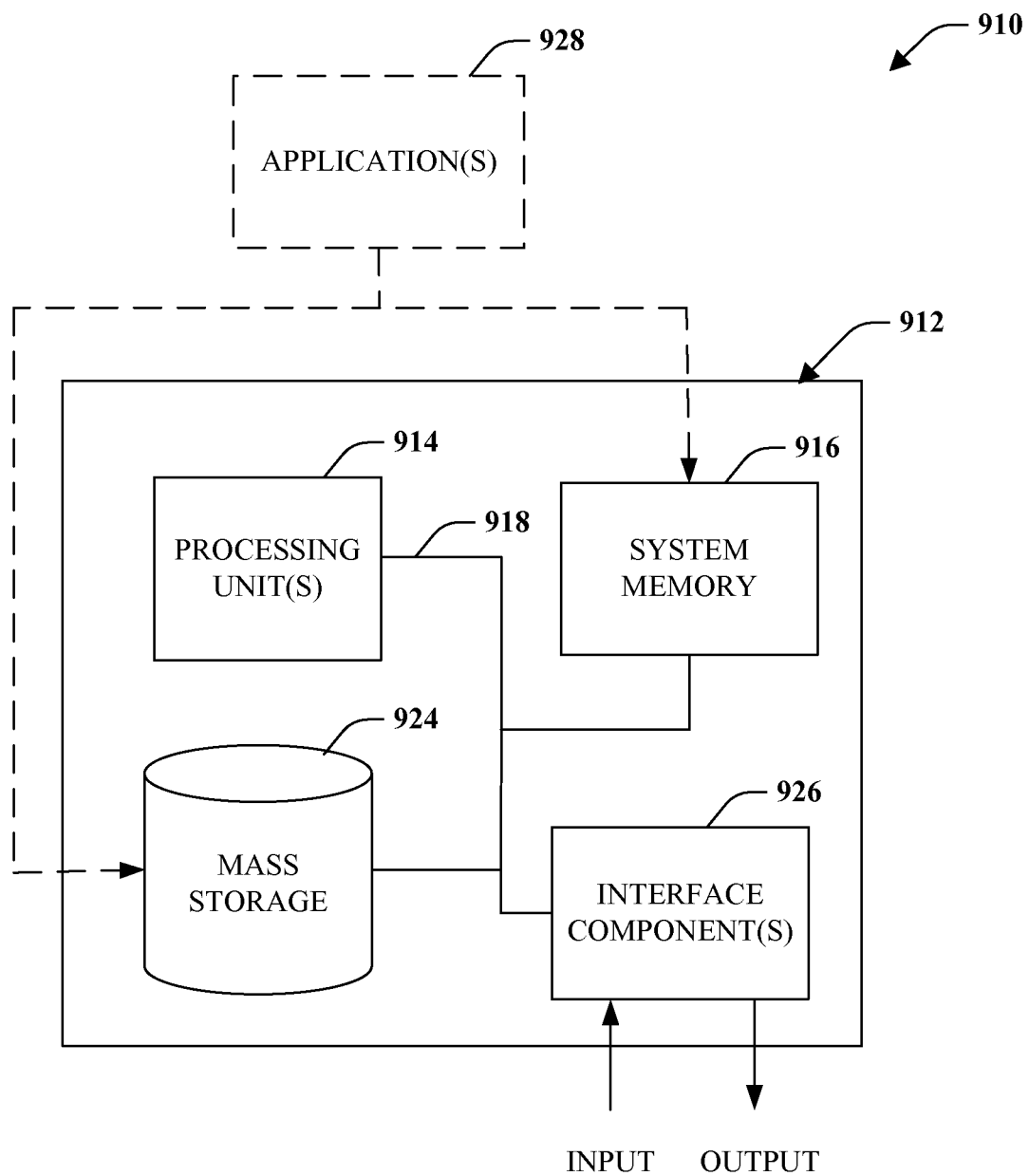
FIG. 9 is a schematic block diagram illustrating a suitable operating environment for aspects of the subject disclosure.
Figure 10:
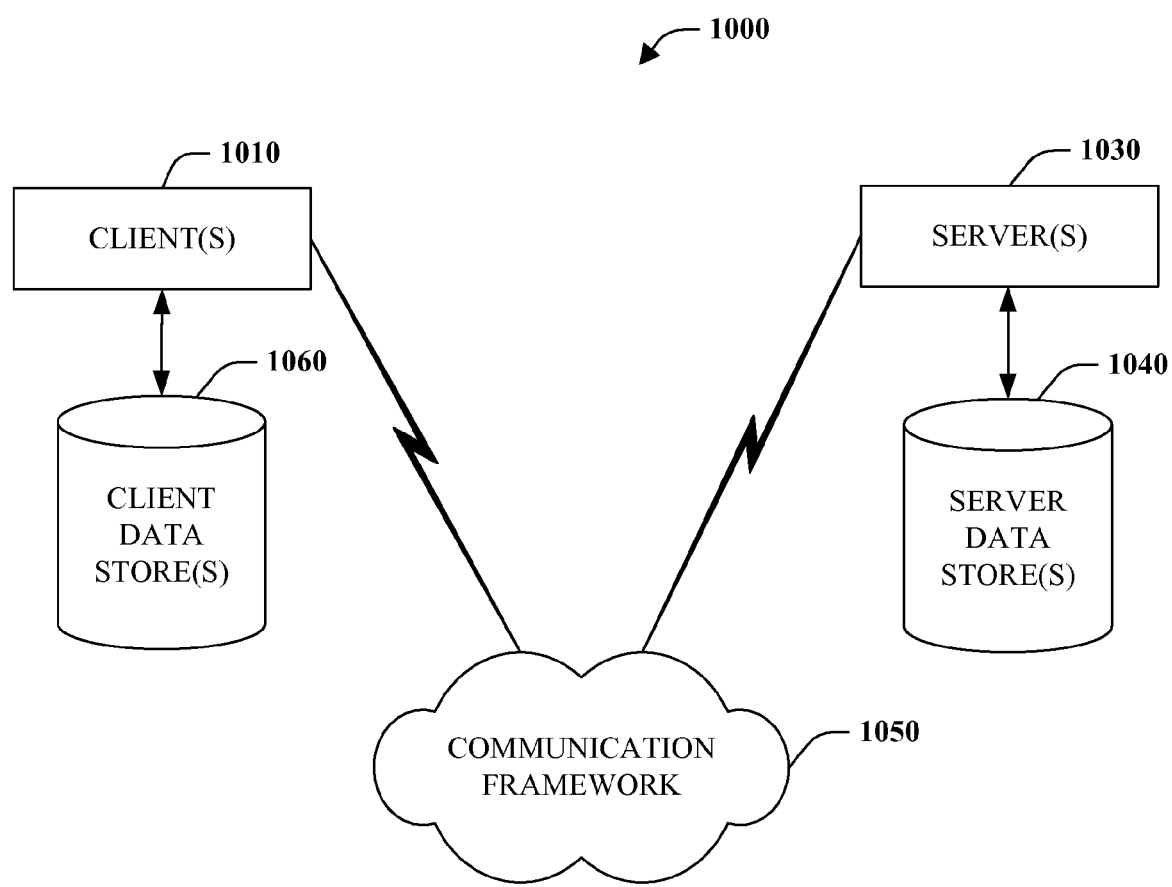
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 910. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, client(s) 1010 can refer to a plurality of mobile devices that support automatic tagging of captured data in accordance with aspects of the foregoing. The client data store(s) 1060 can house information useful for tagging captured data. The server(s) 1030 can provide a backend service for collection and distribution of tagging information including location of client(s) 1010. Information about one or more client(s) 1010 can be housed in the server data store(s) 1040. Such information can include that which is distributable to requesting entities and/or location information about a device. Accordingly, client(s) 1010 can request information from nearby client(s) 1010 for tagging of data from the server(s) 1030.

It should also be appreciated that server(s) 1030 can also refer to other devices acting as a server for one or more client(s) 1010. For example, a digital camera or video recorder could utilize a mobile phone or the like as a server to request and retrieve tagging information. The mobile phone can then communicate with other client(s) 1010 or server(s) 1030 to obtain necessary information in accordance with a multi-tier architecture.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A mobile device comprising:
    a processor;
    a plurality of components associated with a single user, a first one of the plurality of components configured to acquire a first type of information about users of nearby mobile devices and a second one of the plurality of components configured to receive acquired information from the first one of the plurality of components and configured to acquire a second type of information about the users of nearby mobile devices, the first type of information being a different type from the second type of information, at least a portion of the first type of information or the second type of information acquired from one or more of the nearby mobile devices, and at least another portion of the first type of information or the second type of information acquired from a web service via a client-service protocol, the web service maintaining one or more of the first type of information, the second type of information, or location data corresponding to a location of the nearby mobile devices;
    a tag component configured to utilize the first type of information and the second type of information at the second one of the plurality of components to tag data to facilitate at least one of subsequent location, filtration or organization of the data, the tag component being further configured to tag data with the first type of information and the second type of information about the users based on the users being included in a plurality of approved users for which information is stored in or accessible by the mobile device;
    a privacy component configured to interact with the tag component to restrict tagging data to one or more particular users; and
    a computer-readable storage medium storing instructions that, when executed by the processor, cause the processor to implement at least one of the plurality of components, the tag component or the privacy component.

2. The mobile device of claim 1, wherein the data corresponds to at least one of captured images, audio, or video.

3. The mobile device of claim 2, wherein the nearby mobile devices include at least one of a mobile phone, a personal digital assistant, or a hand-held computer.

4. The mobile device of claim 1, further comprising a device communication component configured to request and receive the at least a portion of the first type of information or the second type of information directly from one or more of the nearby mobile devices.

5. The mobile device of claim 1, further comprising an inference component configured to infer one or more tags as a function of the acquired first type of information or second type of information.

6. The mobile device of claim 1, further comprising a context component configured to provide contextual information that can be employed to tag data.

7. The mobile device of claim 1, further comprising an information-provisioning component configured to provide the first type of information and the second type of information to one or more devices or to one or more services.

8. A computer-implemented method, comprising:
    capturing facial data, with a mobile device, that corresponds to an image captured by the mobile device;
    performing facial recognition on the facial data;
    obtaining location data about one or more users of nearby mobile devices, the location data obtained from a service configured to maintain a current geographical location of the nearby mobile devices or obtained from the nearby mobile devices;
    comparing the facial data to the location data about the one or more users of nearby mobile devices;
    inferring presence of the one or more users in the image based at least on the location data and the facial data; and
    labeling the data with information about an identity of the one or more users in the image, the labeling including filtering the data for labeling of the data and describing whether the one or more users are in the image or outside of the image.

9. The computer-implemented method of claim 8, further comprising:
    capturing data that corresponds to a sound;
    obtaining information about one or more users for whom voice data that has been captured;
    performing voice recognition on the voice data and the data; and
    labeling the data with information about an identity of the one or more users based on the performing the voice recognition.

10. A computer storage device comprising instructions stored thereon that, responsive to execution by a processor on a mobile device, perform a method comprising:
    performing facial recognition on facial data corresponding to an image captured by the mobile device;
    obtaining location data about one or more users of nearby mobile devices, the location data obtained from a service configured to maintain a current geographical location of the nearby mobile devices or obtained from the nearby mobile devices;
    comparing the facial data to the location data about the one or more users of nearby mobile devices;
    inferring presence of the one or more users in the image based at least on the location data and the facial data; and labeling the data with information about an identity of the one or more users in the image, the labeling including filtering the data for labeling of the data and describing whether the one or more users are in the image or outside of the image.

11. The computer storage device of claim 10, wherein the instructions, responsive to execution by the processor, perform a method further comprising:
   capturing data that corresponds to a sound;
   obtaining information about one or more users for whom voice data that has been captured;
   performing voice recognition on the voice data and the data; and
   labeling the data with information about an identity of the one or more users based on the performing the voice recognition.

12. The computer storage device of claim 10, wherein the nearby mobile devices include at least one of a mobile phone, a personal digital assistant, or a hand-held computer.

* * * * *